United States Patent Office 3,631,124
Patented Dec. 28, 1971

3,631,124
THERMOPLASTIC MOULDING COMPOSITIONS ON THE BASIS OF POLYACETALS
Karlheinz Burg, Hofheim, Taunus, Klemens Gutweiler, Oberjosbach, Taunus, and Harald Cherdron, Wiesbaden, Germany, assignors to Farbwerke Hoechst Aktiengesellschaft vormals Meister Lucius & Bruning, Frankfurt am Main, Germany
No Drawing. Filed Sept. 26, 1968, Ser. No. 763,015
Claims priority, application Germany, Oct. 13, 1967, P 16 94 206.6
Int. Cl. G08g 37/04, 37/38
U.S. Cl. 260—823                                              7 Claims

ABSTRACT OF THE DISCLOSURE

The invention provides thermoplastic moulding compositions on the basis of polyacetals having an improved impact strength which are obtained by mixing a polyoxymethylene, for example a homo- or copolymer of formaldehyde or trioxan, with a polyether, for example polyethylene oxide.

---

The present invention relates to thermoplastic moulding compositions on the basis of polyacetals having an improved impact strength.

By adding rubber-like polymers to thermoplasts the impact strength is improved while simultaneously the hardness is reduced. In this field French Pat. 1,287,912 proposes mixtures of ethylene-vinyl acetate copolymers with polyolefins, Belgian Pat. 609,574 discloses mixtures of the aforesaid copolymers with polyvinyl chloride and U.S. Pat. 2,953,541 provides mixtures of ethylene-acrylic acid ester copolymers with polyethylene. In all cases thermoplasts are modified that are either amorphous or have a low crystallinity.

According to Japanese Pat. 8816/62 the flowing properties of polyoxymethylenes can be improved by adding thereto 0.1 to 5% by weight of polyalkylene glycol having a molecular weight of up to 10,000, for example polyethylene glycol or polypropylene glycol. By this addition, however, the other properties of the polyoxymethylene are not changed.

The present invention provides thermoplastic moulding compositions comprising 99.5 to 80% by weight of a homo- or copolymer of formaldehyde or trioxan and 0.5 to 20% by weight of an aliphatic polyether containing recurring structural units of the general formula

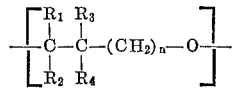

in which $R_1$ to $R_4$ may be identical or different and each represents a hydrogen atom or an alkyl radical having 1 to 6 carbon atoms and $n$ stands for an integer in the range of from 0 to 2.

As regards their hardness and abrasion resistance the products of the invention differ slightly only from unmodified polyacetals, but they have a considerably better impact strength than the starting polyacetal. This result is surprising because polyacetals are highly crystalline polymers (degree of crystallinity of up to 80%) in which a minor disturbance of the crystal structure generally distinctly impairs the mechanical properties.

By polyacetals there are to be understood homopolymers of formaldehyde or trioxan the terminal hydroxyl groups of which are stabilized against degradation, for example by esterification or etherification, as well as copolymers or terpolymers of the said monomers.

Suitable comonomers for trioxan are, above all, cyclic ethers and cyclic acetals in an amount of 0.1 to 20, preferably 0.5 to 5% by weight. The aforesaid comonomers are compounds of the general Formula I

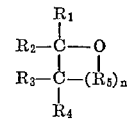

in which $R_1$ to $R_4$ are identical or different and each represents a hydrogen atom or an alkyl radical or a halogenosubstituted alkyl radical and $R_5$ represents either a methylene or oxymethylene radical or an alkyl- or halogenoalkylsubstituted methylene or oxymethylene radical, and $n$ is an integer in the range of from 0 to 3, or the radical —$(O—CH_2—CH_2)_m—OCH_2—$, in which case $n$ being 1 and $m$ an integer of from 1 to 3. The aforesaid alkyl radicals contain 1 to 5 carbon atoms and may contain as substituents 1 to 3 halogen atoms, preferably chlorine atoms.

There are advantageously used cyclic ethers with 3 to 5 ring members, preferably epoxides, for example ethylene oxide, or cyclic acetals with 5 to 11, preferably 5 to 8 ring members, especially cyclic formals of $\alpha,\omega$-diols with 2 to 8 and preferably 2 to 4 carbon atoms, the carbon chain of which may be interrupted by an oxygen atom at intervals of 2 carbon atoms, for example 1,3-dioxolane, 1,3-dioxepane and 1,3,6-trioxocane.

Other suitable cyclic ethers are propylene oxide and epichlorohydrin and other suitable cyclic formals are 4-chloromethyl-1,3-dioxolane, 1,3-dioxonane and 1,4-dioxacycloheptene-(5).

Especially good results are obtained with copolymers of trioxan with ethylene oxide.

As tercomponents which are used in an amount of from 0.05 to 5 and preferably 0.05 to 1% by weight there are advantageously used compounds which improve the flowing properties of the product obtained, for example alkylglycidyl formals, polyglycol diglycidyl ethers and bis(alkane-triol)-triformals of formula II

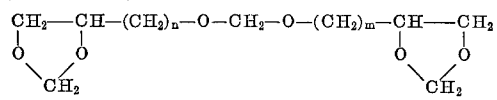

in which $n$ and $m$ each stand for an integer of from 3 to 9, preferably 3 or 4.

Especially suitable are symmetrical bis(alkane-triol)-triformals of Formula II in which $n$ and $m$ represent the same integer, for example bis(1,2,5-pentane-triol)-triformal and more especially bis(1,2,6-hexane-triol)-triformal.

Aliphatic polyethers to be added according to the invention are polymers containing recurring structural units of the general Formula III

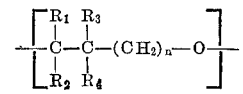

in which $R_1$ to $R_4$ are identical or different and each represents a hydrogen atom or an alkyl radical having 1 to 6 carbon atoms and $n$ is an integer of from 0 to 2. Especially suitable are homopolymers of ethylene oxide, propylene oxide, tetrahydrofurane and 3,3'-dimethyloxetane.

Copolymers of ethylene oxide and propylene oxide prepared by the process disclosed in German Pat. 1,130,599 are especially suitable.

The polyethers used according to the invention have a molecular weight in the range of from 10,000 to 1,000,000, preferably 10,000 to 500,000 and more preferably 10,000 to 100,000.

The polyether can be mixed with the polyacetal in any conventional mixer, for example roller mills, kneaders or extruders. The mixing temperature is suitably above the crystallite melting point of the polyacetal and ranges of from 150 to 250° C., preferably 170 to 200° C.

The amount of polyether to be mixed with the polyacetal depends on the desired properties of the polymer composition and is expediently in the range of from 0.5 to 20% by weight, preferably 1 to 5% by weight.

The polymer compositions of the invention can be moulded in the thermoplastic state into films, sheets, ribbons and injection moulded articles, which are distinguished by an improved impact strength which is higher than that of the starting polyacetal.

The following example serves to illustrate the invention but it is not intended to limit it thereto.

EXAMPLE 2 kilograms of a polyacetal obtained by copolymerization of trioxan and 2% by weight of ethylene oxide were homogenized in an extruder with one screw at 190° C. with varying amounts of the polyethers specified in the table. The residence time in the cylinder was about 4 minutes. The improvement of the impact strength obtained by this modification of the polyacetal was tested by a drop test in which an injection moulded sheet having a thickness of 2 mm. clamped in a frame was broken by a falling body having a weight of 500 grams, the tip of which represented a hemisphere with a radius of 10 mm. As measurement for the impact strength is taken the falling height in centimeters at which the test specimen still absorbs the kinetic energy of the falling body without destruction.

TABLE

Impact strength of modified copolymers of trioxan with 2% by weight of ethylene oxide and varying amounts of polyether

| Test No. | Polyether added | Molecular weight of polyether | Percent by weight of polyether | Falling height (cm.) |
|---|---|---|---|---|
| 1 | | | | 25 |
| 2 | Polytetrahydrofurane | 50,000 | 2 | 225 |
| 3 | do | 50,000 | 1 | 175 |
| 4 | do | 38,000 | 2 | 200 |
| 5 | do | 38,000 | 1 | 125 |
| 6 | do | 38,000 | 0.5 | 50 |
| 7 | Polyethylene oxide | 15,000 | 5 | 225 |
| 8 | do | 15,000 | 3 | 125 |
| 9 | do | 15,000 | 1 | 75 |
| 10 | Copolymer of ethylene oxide and 20% by weight of propylene oxide | ¹ 3.70 | 5 | 350 |
| 11 | do | ¹ 2.53 | 5 | 350 |
| 12 | do | ¹ 1.20 | 5 | 350 |

¹ $\eta_{red}$ value of a solution of the copolymer in benzene at 25° C. in a concentration c of 0.1 g./100 ml. The corresponding $\eta_{red}$ value of a polyethylene glycol having a molecular weight of 20,000 is about 0.52.

What is claimed is:

1. Thermoplastic moulding compositions comprising 99.5 to 80% by weight of a homo- or copolymer of formaldehyde or trioxan and 0.5 to 20% by weight of a copolymer of ethylene oxide and propylene oxide having a molecular weight of 10,000 to 1,000,000.

2. A thermoplastic moulding composition as claimed in claim 1, wherein the trioxan copolymer comprises 99.9% to 80% by weight of trioxan and 0.1 to 20% by weight of a cyclic ether or cyclic acetal of the general formula

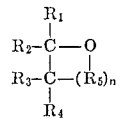

in which $R_1$ to $R_4$ are identical or different and each represents a hydrogen atom or an alkyl radical or a halogenosubstituted alkyl radical and $R_5$ stands for a methylene or oxymethylene radical, an alkyl- or halogenoalkyl-substituted methylene or oxymethylene radical and $n$ is an integer of from 0 to 3, or the radical

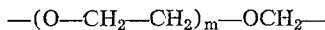

in this case $n$ being 1 and $m$ an integer of from 1 to 3, the aforesaid alkyl radicals containing 1 to 5 carbon atoms.

3. A thermoplastic moulding composition as claimed in claim 1, wherein the trioxan copolymer comprises 99.9 to 80% by weight of trioxan and 0.1 to 20% by weight of a cyclic ether having 3 to 5 ring members or of a cyclic acetal having 5 to 11 ring members.

4. A thermoplastic moulding composition as claimed in claim 1, wherein the trioxan copolymer comprises 99.9 to 80% by weight of trioxan and 0.1 to 20% by weight of an epoxide.

5. A thermoplastic moulding composition as claimed in claim 1, wherein the trioxan copolymer comprises 99.9% to 80% by weight of trioxan and 0.1 to 20% by weight of ethylene oxide.

6. A composition according to claim 1 wherein the molecular weight of the copolymer of ethylene oxide and propylene oxide is 10,000 to 100,000.

7. A composition according to claim 1 wherein the copolymer of ethylene oxide and propylene oxide has a reduced specific viscosity of 1.20 to 3.70 as measured in benzene at 25° C. at a concentration of 0.1 g./100 ml.

References Cited

UNITED STATES PATENTS

| 3,017,389 | 1/1962 | Langsdorf | 260—67 |
| 3,218,295 | 11/1965 | Cline | 260—823 |
| 3,219,623 | 11/1965 | Berardinelli | 260—67 |
| 3,274,129 | 9/1966 | Bailey | 260—33.2 |

SAMUEL H. BLECH, Primary Examiner

U.S. Cl. X.R.

260—2 A, 67 FP